United States Patent
Gao et al.

(10) Patent No.: US 12,432,029 B2
(45) Date of Patent: Sep. 30, 2025

(54) REFERENCE SIGNAL TRANSMISSION METHOD AND APPARATUS

(71) Applicant: HUAWEI TECHNOLOGIES CO., LTD., Guangdong (CN)

(72) Inventors: Lei Gao, Beijing (CN); Xingqing Cheng, Beijing (CN); Jian Wang, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 393 days.

(21) Appl. No.: 18/179,124

(22) Filed: Mar. 6, 2023

(65) Prior Publication Data
US 2023/0208586 A1   Jun. 29, 2023

Related U.S. Application Data

(63) Continuation of application No. PCT/CN2020/113831, filed on Sep. 7, 2020.

(51) Int. Cl.
*H04L 5/00*      (2006.01)
*H04L 27/20*    (2006.01)
*H04L 27/26*    (2006.01)

(52) U.S. Cl.
CPC ........ *H04L 5/0048* (2013.01); *H04L 27/2067* (2013.01); *H04L 27/2602* (2013.01)

(58) Field of Classification Search
CPC .............. H04L 5/0048; H04L 27/2067; H04L 27/2602
See application file for complete search history.

(56) References Cited

U.S. PATENT DOCUMENTS

2021/0360615 A1*  11/2021  Yang .................... H04L 5/0007
2023/0072763 A1*  3/2023   Kim ..................... H04W 76/20

FOREIGN PATENT DOCUMENTS

| CN | 109586868 A | 4/2019 |
| CN | 110754104 A | 2/2020 |
| WO | 2018027222 A1 | 2/2018 |
| WO | 2019099535 A1 | 5/2019 |
| WO | WO-2019095828 A1 * | 5/2019 ....... H04L 25/03159 |

OTHER PUBLICATIONS

Extended European Search Report in European Appln. No. 20952039.4, mailed on Sep. 21, 2023, 7 pages.

* cited by examiner

*Primary Examiner* — Duc C Ho
(74) *Attorney, Agent, or Firm* — Fish & Richardson P.C.

(57) ABSTRACT

Example reference signal transmission methods and apparatus are described. One example method includes that a first node maps a reference signal to a first transmission resource and sends the reference signal. The first transmission resource is included in a second transmission resource used by the first node to send data, and the second transmission resource includes a first symbol and at least one subcarrier corresponding to the first symbol. The first transmission resource includes at least one of an $M^{th}$ subcarrier or an $N^{th}$-to-last subcarrier in the at least one subcarrier corresponding to the first symbol, and M and N are preset, specified in a protocol, or configured. The reference signal is used to determine phase information of a channel.

20 Claims, 5 Drawing Sheets

REFERENCE SIGNAL TRANSMISSION METHOD AND APPARATUS

CROSS-REFERENCE TO RELATED APPLICATIONS

This application is a continuation of International Application No. PCT/CN2020/113831, filed on Sep. 7, 2020, the disclosure of which is hereby incorporated by reference in its entirety.

TECHNICAL FIELD

This application relates to the field of communication technologies, and in particular, to a reference signal transmission method and apparatus.

BACKGROUND

To meet a requirement of a low delay and high reliability of a noise reduction service, a vehicle-mounted short-range wireless communication system may support solutions of a demodulation reference signal (demodulation reference signal, DMRS) and a phase tracking reference signal (phase tracking reference signal, PTRS). The DMRS is used for channel estimation, and the PTRS is used for tracking a phase change of a channel.

Currently, a PTRS resource allocation method includes a resource allocation manner in a wireless-fidelity (wireless-fidelity, Wi-Fi) technology. However, because a frequency domain resource allocation manner for the noise reduction service in the vehicle-mounted short-range wireless communication system is different from a resource allocation manner in the Wi-Fi technology, a manner of configuring a PTRS resource in Wi-Fi is not applicable to the vehicle-mounted short-range wireless communication system. For example, a frequency domain resource allocation manner for each noise reduction service in the vehicle-mounted short-range wireless communication system is any plurality of continuous or discontinuous subcarriers, a radio frame is used as a period in time domain, and each period includes one or more symbols. In the Wi-Fi technology, a frequency domain resource of the PTRS is a subcarrier specified in a protocol, and a time domain resource is all allocated symbols. If the manner of configuring a PTRS resource in the Wi-Fi technology is used, it cannot be ensured that the PTRS resource is configured for each noise reduction service in the vehicle-mounted short-range wireless communication system.

SUMMARY

This application provides a reference signal transmission method and apparatus, to ensure that channel phase tracking can be performed on a reference signal resource for each service.

According to a first aspect, an embodiment of this application provides a reference signal transmission method. The method includes: A first node maps a reference signal to a first transmission resource. The first transmission resource is included in a second transmission resource, the second transmission resource is used by the first node to send data, and the second transmission resource includes a first symbol and at least one subcarrier corresponding to the first symbol. The first transmission resource includes at least one of an $M^{th}$ subcarrier or an $N^{th}$-to-last subcarrier in the at least one subcarrier corresponding to the first symbol, M and N are integers greater than 0, and M and N are preset, specified in a protocol, or configured. The reference signal is used to determine phase information of a channel. The first node sends the reference signal. The second transmission resource is a resource that is scheduled for a single time and that is used by the first node to send data, or the second transmission resource is a resource used by the first node to send service data for a single time. In this embodiment of this application, a time domain location and a frequency domain location of a reference signal resource in a time-frequency resource scheduled by a service are specified, so that a reference signal resource is configured for each service for channel phase tracking, to meet a requirement of a low delay and high reliability of transmission of each service.

In a possible design, the first transmission resource further includes at least one of an $A^{th}$ subcarrier or a $B^{th}$-to-last subcarrier in the at least one subcarrier corresponding to the first symbol, where A and B are integers greater than 0, and A and B are preset, specified in the protocol, or configured. According to the foregoing design, each service has a large quantity of reference signal resources for channel phase tracking, to improve channel estimation precision.

In a possible design, M and N are configured by a second node by using a first message, or M and N are configured by the first node by using a second message. In the foregoing design, M and N may be configured by a primary node. If the first node is the primary node, M and N may be configured by the first node by using the second message. If the second node is the primary node, M and N may be configured by the second node by using the first message.

In a possible design, a value of M includes at least one of the following values: 1 and 2. In the foregoing design, a location of a subcarrier to which the reference signal is mapped is specified by using a simple rule, so that the solution is easy to implement.

In a possible design, a value of N includes at least one of the following values: 1 and 2. In the foregoing design, a location of a subcarrier to which the reference signal is mapped is specified by using a simple rule, so that the solution is easy to implement.

In a possible design, a quantity of subcarriers included in the first transmission resource is related to a quantity of subcarriers included in the second transmission resource. According to the foregoing manner, it can be ensured that each service has sufficient (that is, enough to achieve a high enough signal-to-noise ratio for each time of phase tracking, to achieve a high enough phase tracking accuracy) resources in frequency domain to send a reference signal. Under a same channel condition, a larger quantity of subcarriers on which a reference signal is sent in a symbol scheduled for each service indicates a higher accuracy of estimating a channel phase change each time. A larger quantity of subcarriers on which a reference signal is sent in a symbol scheduled for each service indicates better robustness of each estimated channel phase change to a channel condition. Therefore, in the foregoing manner, accuracy and robustness of channel estimation for the service can be improved.

In a possible design, a quantity of subcarriers included in the first transmission resource is related to a modulation and coding scheme MCS. According to the foregoing manner, reference signal transmission can adapt to different quality of service (quality of service, QoS) requirements, different channel conditions, and different MCSs.

In a possible design, the subcarriers included in the first transmission resource are not arranged at an equal spacing. According to the foregoing design, unnecessary limitation on the frequency domain resource for sending the reference signal can be reduced, and resource overheads for sending the reference signal can be reduced.

In a possible design, the first symbol is a $P^{th}$ symbol that belongs to the second transmission resource and that is in every L time-domain resource units, and L and P are integers greater than 0. Alternatively, the first symbol is a $Q^{th}$ symbol that belongs to the second transmission resource and that is in every H first time-domain resource units, the first time-domain resource unit is a time-domain resource unit that includes some or all resources of the second transmission resource, and H and Q are integers greater than 0. Alternatively, the first symbol is a $J^{th}$ symbol that belongs to the second transmission resource and that is in a $T^{th}$ first time-domain resource unit in every W time-domain resource units, the first time-domain resource unit is a time-domain resource unit that includes some or all resources of the second transmission resource, and W, T, and J are integers greater than 0. Alternatively, the first symbol is a $R^{th}$ symbol that belongs to the second transmission resource and that is in a $K^{th}$ time-domain resource unit in every G first time-domain resource units, the first time-domain resource unit is a time-domain resource unit that includes some or all resources in the second transmission resource, and G, K, and R are integers greater than 0.

According to the foregoing design, a density and/or a location of a time domain resource of a reference signal may be flexibly configured, to flexibly adapt to different channel phase change characteristics or different channel phase change speeds, and reduce reference signal resource overheads while a requirement is met.

In a possible design, L and P are configured by the second node by using a third message, or H and Q are configured by the second node by using a third message, or G, K, and R are configured by the second node by using a third message, or W, T, and J are configured by the second node by using a third message. Alternatively, L and P are configured by the first node by using a fourth message, or H and Q are configured by the first node by using a fourth message, or G, K, and R are configured by the first node by using a fourth message, or W, T, and J are configured by the first node by using a fourth message. In the foregoing design, the location of the first symbol may alternatively be configured by the primary node. If the first node is the primary node, the location of the first symbol is configured by the first node by using the fourth message. If the second node is the primary node, the location of the first symbol is configured by the second node by using the third message.

In a possible design, a value of L is 1, and/or a value of P is 1; or a value of H is 1, and/or a value of Q is 1; or a value of G is 1, and/or a value of K is 1, and/or a value of R is 1; or a value of W is 1, and/or a value of T is 1, and/or a value of J is 1. In the foregoing design, the location of the first symbol is specified by using a simple rule, so that the solution is easy to implement.

In a possible design, the reference signal and a synchronization signal have a same complex number mapped to a same subcarrier.

In a possible design, a complex number that is of the reference signal and that is mapped to a first resource unit in the first transmission resource based on quadrature phase shift keying (quadrature phase shift keying, QPSK) modulation is related to a frequency domain location and/or a time domain location of the first resource unit. According to the foregoing manner, complex numbers mapped to different subcarriers and/or different symbols may be different, and an effect of interference randomization is achieved.

In a possible design, the second transmission resource is scheduled by using a subcarrier as a granularity in frequency domain.

According to a second aspect, an embodiment of this application provides a reference signal transmission method. The method includes: A second node receives a reference signal on a first transmission resource. The first transmission resource is included in a second transmission resource, the second transmission resource is used by a first node to send data, and the second transmission resource includes a first symbol and at least one subcarrier corresponding to the first symbol. The first transmission resource includes at least one of an $M^{th}$ subcarrier or an $N^{th}$-to-last subcarrier in the at least one subcarrier corresponding to the first symbol, M and N are integers greater than 0, and M and N are preset, specified in a protocol, or configured. The reference signal is used to determine phase information of a channel. The second node determines phase information of a channel based on the reference signal. The second transmission resource is a resource that is scheduled for a single time and that is used by the first node to send data, or the second transmission resource is a resource used by the first node to send service data for a single time. In this embodiment of this application, a time domain location and a frequency domain location of a reference signal resource in a time-frequency resource scheduled by a service are specified according to a simple rule, so that a reference signal resource is configured for each service for channel phase tracking, to meet a requirement of a low delay and high reliability of transmission of each service.

In a possible design, the first transmission resource further includes at least one of an $A^{th}$ subcarrier or a $B^{th}$-to-last subcarrier in the at least one subcarrier corresponding to the first symbol, where A and B are integers greater than 0, and A and B are preset, specified in the protocol, or configured. According to the foregoing design, each service has a large quantity of reference signal resources for channel phase tracking, to improve channel estimation precision.

In a possible design, M and N are configured by a second node by using a first message, or M and N are configured by the first node by using a second message. In the foregoing design, M and N may be configured by a primary node. If the first node is the primary node, M and N may be configured by the first node by using the second message. If the second node is the primary node, M and N may be configured by the second node by using the first message.

In a possible design, a value of M includes at least one of the following values: 1 and 2. In the foregoing design, a location of a subcarrier to which the reference signal is mapped is specified by using a simple rule, so that the solution is easy to implement.

In a possible design, a value of N includes at least one of the following values: 1 and 2. In the foregoing design, a location of a subcarrier to which the reference signal is mapped is specified by using a simple rule, so that the solution is easy to implement.

In a possible design, a quantity of subcarriers included in the first transmission resource is related to a quantity of subcarriers included in the second transmission resource. According to the foregoing manner, it can be ensured that each service has sufficient (that is, enough to achieve a high enough signal-to-noise ratio for each time of phase tracking, to achieve a high enough phase tracking accuracy) resources in frequency domain to send a reference signal. Under a same channel condition, a larger quantity of subcarriers on which a reference signal is sent in a symbol scheduled for each service indicates a higher accuracy of estimating a channel phase change each time. A larger quantity of subcarriers on which a reference signal is sent in a symbol scheduled for each service indicates better robustness of each estimated channel phase change to a channel condition. Therefore, in the foregoing manner, accuracy and robustness of channel estimation for the service can be improved.

In a possible design, a quantity of subcarriers included in the first transmission resource is related to a modulation and coding scheme MCS. According to the foregoing manner, reference signal transmission can adapt to different QoS requirements, different channel conditions, and different MCSs.

In a possible design, the subcarriers included in the first transmission resource are not arranged at an equal spacing. According to the foregoing design, unnecessary limitation on the frequency domain resource for sending the reference signal can be reduced, and resource overheads for sending the reference signal can be reduced.

In a possible design, the first symbol is a $P^{th}$ symbol that belongs to the second transmission resource and that is in every L time-domain resource units, and L and P are integers greater than 0. Alternatively, the first symbol is a $Q^{th}$ symbol that belongs to the second transmission resource and that is in every H first time-domain resource units, the first time-domain resource unit is a time-domain resource unit that includes some or all resources of the second transmission resource, and H and Q are integers greater than 0. Alternatively, the first symbol is a $J^{th}$ symbol that belongs to the second transmission resource and that is in a $T^{th}$ first time-domain resource unit in every W time-domain resource units, the first time-domain resource unit is a time-domain resource unit that includes some or all resources of the second transmission resource, and W, T, and J are integers greater than 0. Alternatively, the first symbol is a $R^{th}$ symbol that belongs to the second transmission resource and that is in a $K^{th}$ time-domain resource unit in every G first time-domain resource units, the first time-domain resource unit is a time-domain resource unit that includes some or all resources in the second transmission resource, and G, K, and R are integers greater than 0.

According to the foregoing design, a density and/or a location of a time domain resource of a reference signal may be flexibly configured, to flexibly adapt to different channel phase change characteristics or different channel phase change speeds, and reduce reference signal resource overheads while a requirement is met.

In a possible design, L and P are configured by the second node by using a third message, or H and Q are configured by the second node by using a third message, or G, K, and R are configured by the second node by using a third message, or W, T, and J are configured by the second node by using a third message. Alternatively, L and P are configured by the first node by using a fourth message, or H and Q are configured by the first node by using a fourth message, or G, K, and R are configured by the first node by using a fourth message, or W, T, and J are configured by the first node by using a fourth message. In the foregoing design, the location of the first symbol may alternatively be configured by the primary node. If the first node is the primary node, the location of the first symbol is configured by the first node by using the fourth message. If the second node is the primary node, the location of the first symbol is configured by the second node by using the third message.

In a possible design, a value of L is 1, and/or a value of P is 1; or a value of H is 1, and/or a value of Q is 1; or a value of G is 1, and/or a value of K is 1, and/or a value of R is 1; or a value of W is 1, and/or a value of T is 1, and/or a value of J is 1. In the foregoing design, the location of the first symbol is specified by using a simple rule, so that the solution is easy to implement.

In a possible design, the reference signal and a synchronization signal have a same complex number mapped to a same subcarrier.

In a possible design, a complex number that is of the reference signal and that is mapped to a first resource unit in the first transmission resource based on QPSK modulation is related to a frequency domain location and/or a time domain location of the first resource unit. According to the foregoing manner, complex numbers mapped to different subcarriers and/or different symbols may be different, and an effect of interference randomization is achieved.

In a possible design, the second transmission resource is scheduled by using a subcarrier as a granularity in frequency domain.

According to a third aspect, this application provides a communication apparatus. The apparatus has a function of implementing any one of the first aspect and the possible designs of the first aspect. The function may be implemented by hardware, or may be implemented by hardware executing corresponding software. The hardware or the software includes one or more modules corresponding to the foregoing function.

According to a fourth aspect, this application provides a communication apparatus. The apparatus has a function of implementing any one of the second aspect and the possible designs of the second aspect. The function may be implemented by hardware, or may be implemented by hardware executing corresponding software. The hardware or the software includes one or more modules corresponding to the foregoing function.

According to a fifth aspect, this application provides an electronic device, including a processor and a memory. The memory is configured to store computer-executable instructions. When the electronic device runs, the processor executes the computer-executable instructions stored in the memory, to enable the electronic device to perform the method according to any one of the first aspect or the designs of the first aspect.

According to a sixth aspect, this application provides an electronic device, including a processor and a memory. The memory is configured to store computer-executable instructions. When the electronic device runs, the processor executes the computer-executable instructions stored in the memory, to enable the electronic device to perform the method according to any one of the second aspect or the designs of the second aspect.

According to a seventh aspect, a computer storage medium is provided. The computer storage medium stores a computer program, and the computer program includes instructions used to perform the methods according to the foregoing aspects.

According to an eighth aspect, a computer program product including instructions is provided. When the computer program product runs on a computer, the computer is enabled to perform the methods according to the foregoing aspects.

According to a ninth aspect, this application provides a chip. The chip is coupled to a memory, and is configured to read and execute program instructions stored in the memory, to implement the method according to any one of the first aspect or the possible designs of the first aspect.

According to a tenth aspect, this application provides a chip. The chip is coupled to a memory, and is configured to read and execute program instructions stored in the memory, to implement the method according to any one of the second aspect or the possible designs of the second aspect.

DESCRIPTION OF EMBODIMENTS

Diversified vehicle-mounted applications lead to increasingly more in-vehicle communication nodes and more types of in-vehicle communication nodes, and impose a higher requirement on a vehicle-mounted communication capability. Compared with the conventional wired communication, in-vehicle wireless communication can further reduce a quantity, length, and weight of internal wiring harnesses of a vehicle, and corresponding installation, and maintenance costs. Therefore, the in-vehicle communication technology is gradually becoming wireless.

Figure 1:
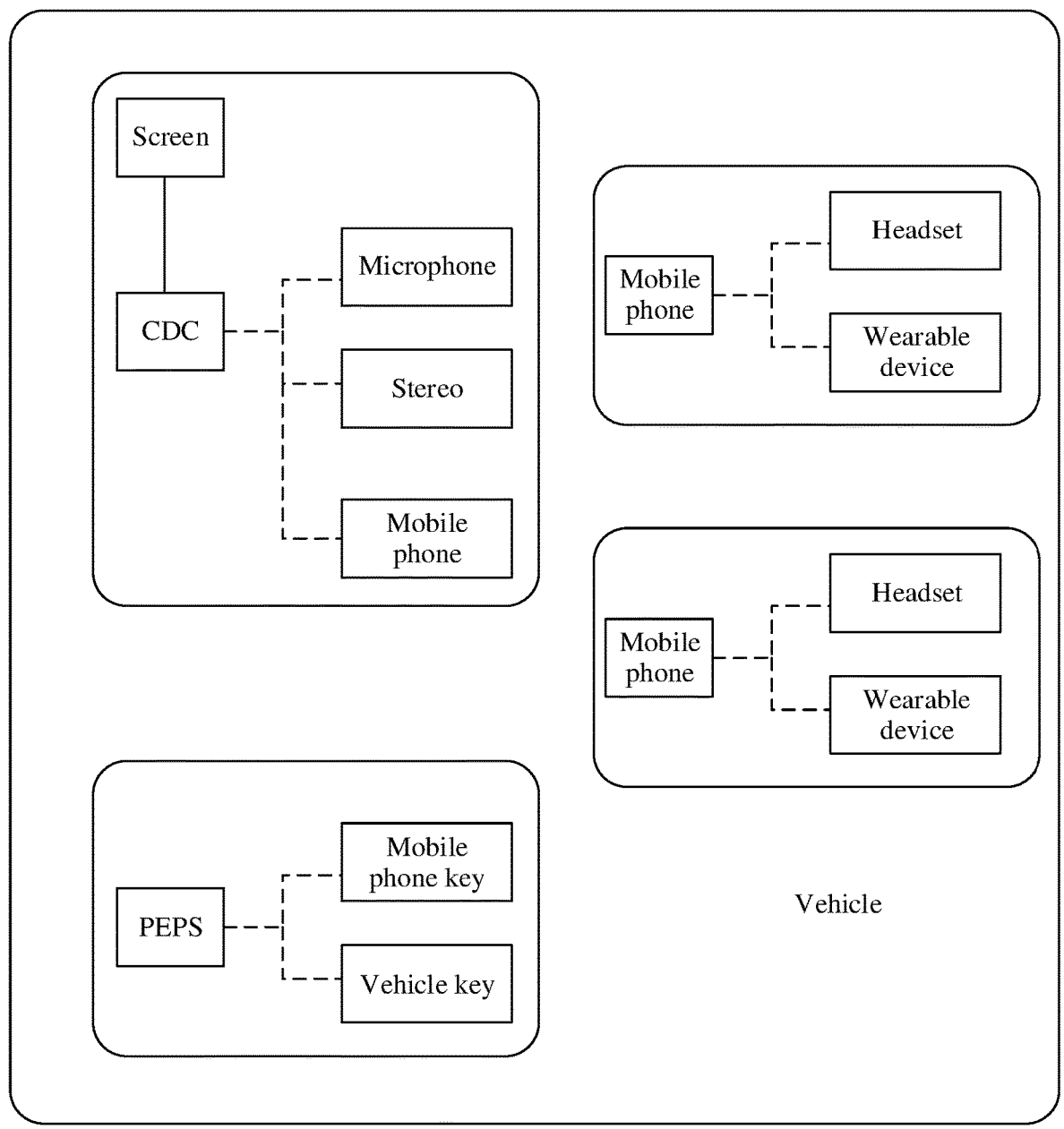
FIG. 1 is a schematic diagram of a topological relationship of an in-vehicle communication link according to an embodiment of this application.

Usually, there are a plurality of communication domains in a vehicle. One communication domain includes one primary node and at least one secondary node. The primary node schedules the secondary node, so that the primary node and the secondary node transmit data to each other. The primary node manages the secondary node, has a resource allocation function, and is responsible for allocating resources to the secondary node. The secondary node communicates, based on scheduling of the primary node, with the primary node by using the resources allocated by the primary node. For example, a topological relationship of an in-vehicle communication link may be shown in FIG. 1. A mobile phone, a headset, and a wearable device may form a communication domain; a screen, a cockpit domain controller (cockpit domain controller, CDC), a microphone, a stereo, and a mobile phone may form a communication domain; and a passive entry passive start (passive entry passive start, PEPS), a mobile phone key, and a vehicle key may form a communication domain.

Data transmitted between a primary node and a secondary node may include service data, signaling, and some signals (such as a synchronization signal and a reference signal). The service data includes types such as noise reduction service data and dynamic service data, and the signaling includes types such as physical layer signaling and higher layer signaling.

Audio data transmission related to a noise reduction service (referred to as a noise reduction service) is a common service that needs to be supported by in-vehicle communication. The service includes data transmission from a secondary node to a primary node (for example, transmission from a microphone for noise reduction to a CDC), and also includes data transmission from a primary node to a secondary node (for example, transmission from a CDC to a horn related to noise reduction). The service has a very high requirement on delay, for example, a delay requirement of about 20 μs. The service also has a high requirement on reliability, and due to a very low delay requirement, it is late to perform retransmission, and a reliability requirement of a single transmission is high.

In an in-vehicle noise reduction service, a vehicle-mounted short-range wireless communication system may use a DMRS solution and a PTRS solution.

However, a frequency domain resource allocation manner for a noise reduction service in the vehicle-mounted short-range wireless communication system is different from a resource allocation manner of a new radio (new radio, NR) and a Wi-Fi technology, therefore, neither a manner of configuring a PTRS resource by Wi-Fi nor a manner of configuring a PTRS resource by NR is applicable to the vehicle-mounted short-range wireless communication system.

For example, a resource allocation manner for a service in Wi-Fi is full bandwidth in frequency domain and a plurality of consecutive symbols in time domain. A frequency domain resource of the PTRS is a subcarrier specified in a protocol, and a time domain resource is all allocated symbols. A frequency domain resource allocation manner for each noise reduction service in the vehicle-mounted short-range wireless communication system is any plurality of continuous or discontinuous subcarriers, a radio frame is used as a period in time domain, and each period includes one or more symbols. If the manner of configuring the PTRS resource in the Wi-Fi technology is used, the PTRS is sent on a subcarrier specified in a protocol, and a subcarrier scheduled by the noise reduction service may not include the subcarrier specified in the protocol, therefore, the noise reduction service does not have a PTRS resource for phase tracking. Therefore, it cannot be ensured that a PTRS resource is configured in a frequency domain for each noise reduction service in the vehicle-mounted short-range wireless communication system when the manner of configuring the PTRS resource in the Wi-Fi technology is used.

However, a resource allocation manner for a service in NR is one or more consecutive RBs in frequency domain, and one or more consecutive slots in time domain. A location of a subcarrier on which the PTRS resource is located in the RB is obtained through calculation based on a scheduled resource and a radio network temporary identifier (radio network temporary identifier, RNTI) of the terminal device. A location of a symbol on which the PTRS resource is located in a slot is obtained through calculation based on the scheduled resource and the RNTI of the terminal device. A frequency domain resource allocation manner for each noise reduction service in the vehicle-mounted short-range wireless communication system is any plurality of continuous or discontinuous subcarriers, a radio frame is used as a period in time domain, and each period includes one or more symbols. If a PTRS resource configuration manner in the NR technology is used, a subcarrier on which the PTRS is located and a symbol on which the PTRS is located need to be determined based on the scheduled resource and the RNTI of the terminal device. However, a subcarrier obtained through calculation based on the scheduled resource and the RNTI of the terminal device may not be a subcarrier scheduled by the noise reduction service, therefore, the noise reduction service does not have a PTRS resource for phase tracking. Therefore, it cannot be ensured that a PTRS resource is configured in a frequency domain for each noise reduction service in the vehicle-mounted short-range wireless communication system when the manner of configuring the PTRS resource in the NR technology is used.

Based on this, embodiments of this application provide a reference signal transmission method and apparatus, to resolve a problem that channel estimation reliability is poor because it cannot be ensured that each noise reduction service has a PTRS resource in frequency domain in a vehicle-mounted short-range wireless communication system in the conventional technology. The method and the apparatus are based on a same concept. Because principles for resolving a problem by using the method and the apparatus are similar, mutual reference may be made between implementations of the apparatus and the method, and repeated descriptions are omitted.

Embodiments of this application may be used in an in-vehicle wireless communication scenario; or may be used in another wireless communication scenario, for example, a wide area wireless communication scenario or a local area wireless communication scenario.

Figure 2:
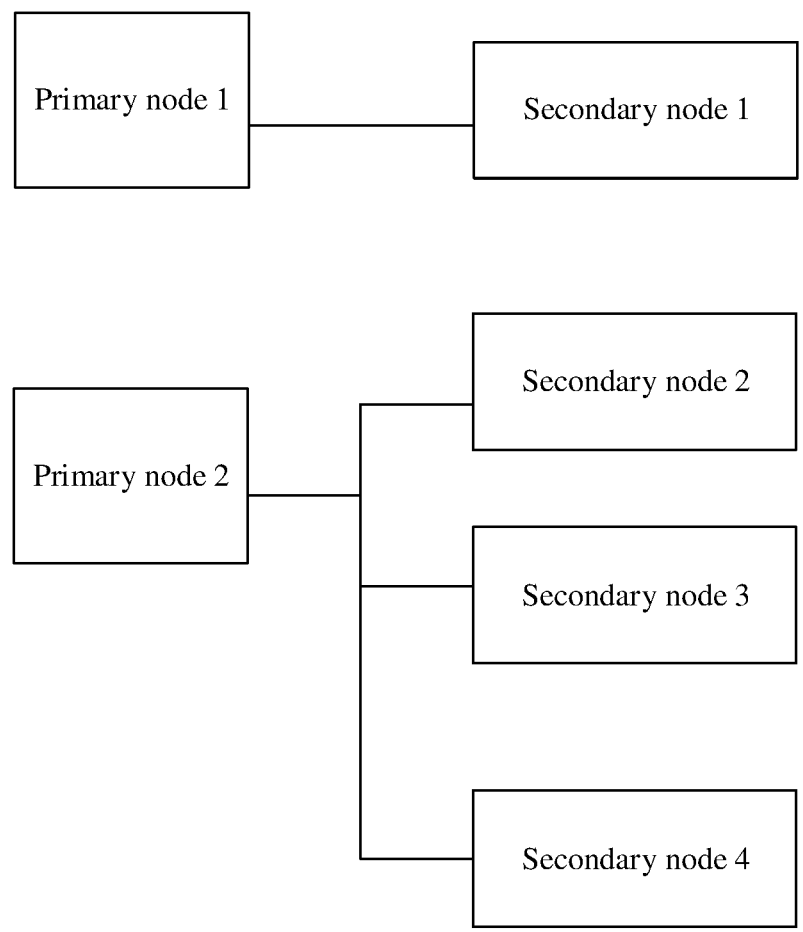
FIG. 2 is a schematic diagram of a structure of a vehicle-mounted communication system according to an embodiment of this application.

Embodiments of this application may be applied to a communication system. The communication system includes at least one primary node and at least one secondary node. The primary node may schedule the secondary node, to implement mutual data transmission between primary node and the secondary node. For example, as shown in FIG. 2, a vehicle-mounted wireless communication system may include a primary node 1, a primary node 2, and secondary nodes 1 to 4. The primary node 1 is connected to the secondary node 1, and the primary node 1 may schedule the secondary node 1, to implement mutual data transmission between the primary node 1 and the secondary node 1. The primary node 2 is connected to the secondary nodes 2 to 3, and the primary node 2 may schedule the secondary nodes 2 to 4, to implement mutual data transmission between the primary node 2 and the secondary nodes 2 to 4. It should be understood that FIG. 2 is merely an example for description, and does not specifically limit a quantity of primary nodes and a quantity of secondary nodes included in the vehicle-mounted wireless communication system.

For example, in an in-vehicle wireless communication scenario, the primary node may be a CDC, and the secondary node may be a speaker, a microphone, a sound box, a mobile phone, or the like that is related to noise reduction and that communicates with the CDC. Certainly, the primary node and the secondary node may also be other vehicle-mounted devices, which are not listed one by one herein. Data transmitted between the primary node and the secondary node may include service data, signaling, and some signals (such as a synchronization signal and a reference signal). The service data includes types such as noise reduction service data and dynamic service data, and the signaling includes types such as physical layer signaling and higher layer signaling.

For example, in a wide area wireless communication scenario, the primary node may be a base station, and the secondary node may be a terminal device.

In a local wireless communication scenario, the primary node may be an access point (access point, AP), and the secondary node may be a station (Station).

It should be understood that the primary node and the secondary node in embodiments of this application are logical concepts. In practice, the primary node and the secondary node may be in a form of a physical device, a box, or may be a board, or a function implemented by a chip or an area on a board.

It should be understood that, in embodiments of this application, "at least one" refers to one or more, and "a plurality of" refers to two or more. The term "and/or" describes an association relationship between associated objects, and indicates that three relationships may exist. For example, A and/or B may indicate the following cases: Only A exists, both A and B exist, and only B exists, where A and B may be singular or plural. The character "/" usually indicates an "or" relationship between the associated objects. "At least one of the following pieces (items)" or a similar expression thereof indicates any combination of these items, including a single item (piece) or any combination of a plurality of items (pieces). For example, at least one of a, b, or c may indicate a, b, c, a and b, a and c, b and c, or a, b, and c, where a, b, and c may be singular or plural.

It should be understood that, in descriptions of this application, terms such as "first" and "second" are merely used for a purpose of distinguishing for description, and should not be construed as indicating or implying relative importance, nor as indicating or implying a sequence.

The following describes in detail embodiments of this application with reference to accompanying drawings.

Figure 3:
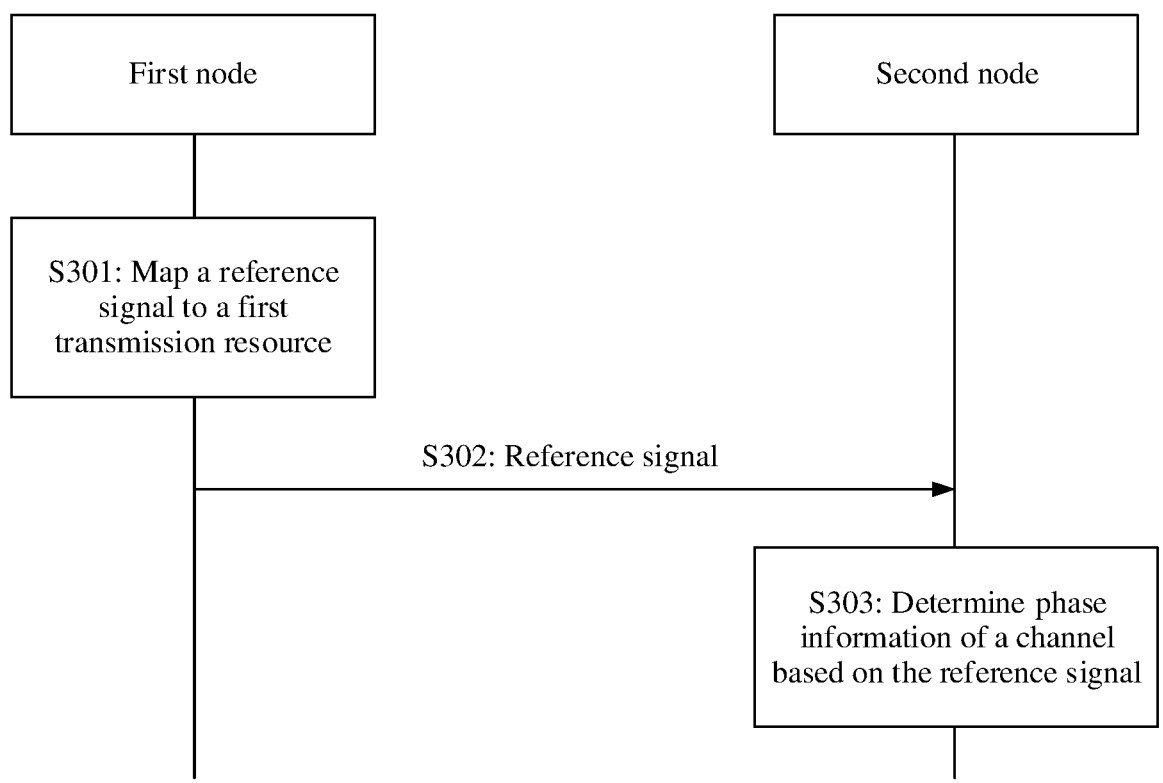
FIG. 3 is a schematic flowchart of a reference signal transmission method according to an embodiment of this application.

FIG. 3 is a flowchart of a reference signal transmission method according to an embodiment of this application. The method provided in this embodiment of this application may be applied to a first node and a second node. The first node may be a primary node, and the second node is a secondary node; or the second node is a primary node, and the first node is a secondary node. This is not specifically limited herein.

The method may specifically include the following steps.

S301: The first node maps a reference signal to a first transmission resource, where the reference signal is used to determine phase information of a channel. For example, the reference signal may be a PTRS, a phase adjusting signal (phase adjusting signal, PAS), or another signal that has a function of determining phase information of a channel.

The first transmission resource is included in a second transmission resource, the second transmission resource is used by the first node to send data, and the second transmission resource includes a first symbol and at least one subcarrier corresponding to the first symbol. It is clear that the second transmission resource may further include another symbol. This is not specifically limited herein.

Optionally, the second transmission resource is a resource that is scheduled for a single time and that is used by the first node to send data, or the second transmission resource is a resource used by the first node to send service data for a single time.

In a possible implementation, the first node may determine, in a scheduled resource (namely, the second transmission resource) for one service transmission by using a rule, for example, an $M^{th}$ subcarrier or an $N^{th}$-to-last subcarrier, the first transmission resource for transmitting the reference signal.

For example, the second transmission resource may be scheduled by using a subcarrier as a granularity in frequency domain.

Subcarriers included in the second transmission resource may be continuous or discontinuous.

It should be understood that in this embodiment of this application, only a subcarrier is used as a frequency domain unit for description in frequency domain. In a specific embodiment, a frequency domain unit of another granularity may alternatively be used, for example, a resource block (resource block, RB), or the like. Only a symbol is used as a time domain unit for description in time domain. In a specific embodiment, a time domain unit of another granularity may alternatively be used, for example, a subframe or a slot. In this embodiment of this application, a subcarrier corresponding to one symbol may alternatively be expressed as a RE corresponding to one symbol.

The first transmission resource includes an $M^{th}$ subcarrier in the at least one subcarrier corresponding to the first symbol, or the first transmission resource includes an $N^{th}$-to-last subcarrier in the at least one subcarrier corresponding to the first symbol, or the first transmission resource includes an $M^{th}$ subcarrier and an $N^{th}$-to-last subcarrier in the at least one subcarrier corresponding to the first symbol. M and N are integers greater than 0, and M and N may be preset, or may be specified in a protocol, or may be configured.

It may be understood that the at least one subcarrier corresponding to the first symbol is sorted in ascending order of frequency domain indexes, a subcarrier ranking first (or with a smallest frequency domain index) is a first subcarrier, and a subcarrier ranking last (or with a largest frequency domain index) in the at least one subcarrier corresponding to the first symbol is a last subcarrier.

For example, M and N may be configured by the primary node. For example, it is assumed that the second node is the primary node, and M and N may be configured by the second node by using a first message. To be specific, the second node sends the first message to the first node, and the first message includes information about values of M and N. For another example, it is assumed that the first node is the primary node, and M and N may be configured by the first node by using a second message. To be specific, the first node sends the first message to the second node, and the second message includes information about values of M and N. According to the foregoing manner, the frequency domain location of the first transmission resource may be flexibly configured to adapt to different channel conditions, especially different channel frequency selection characteristics.

Alternatively, M and N may be determined according to a preset specification or a protocol specification. For example, M and N may be determined based on an identifier of the first node, or M and N may be determined based on an identifier of the second node.

For example, M may be equal to 1, that is, the first transmission resource includes the first subcarrier in the at least one subcarrier corresponding to the first symbol. Alternatively, M may be equal to 2, that is, the first transmission resource includes a second subcarrier in the at least one subcarrier corresponding to the first symbol.

For example, N may be equal to 1, that is, the first transmission resource includes the last subcarrier in the at least one subcarrier corresponding to the first symbol. Alternatively, N may be equal to 2, that is, the first transmission resource includes a second-to-last subcarrier in the at least one subcarrier corresponding to the first symbol.

In some embodiments, in addition to the $M^{th}$ subcarrier and the $N^{th}$-to-last subcarrier, the first transmission resource may further include at least one of an $A^{th}$ subcarrier or a $B^{th}$-to-last subcarrier in the at least one subcarrier corresponding to the first symbol. A and B are integers greater than 0. A and B may be preset, or may be specified in the protocol, or may be configured. For configuration manners of A and B, refer to related descriptions of configuring M and N. Details are not described herein again.

For example, it is assumed that M is equal to 1 and A is equal to 2. To be specific, the first transmission resource may include the first subcarrier and the second subcarrier in the at least one subcarrier corresponding to the first symbol. For another example, it is assumed that N is equal to 1 and B is equal to 3. To be specific, the first transmission resource may include the last subcarrier and a third-to-last subcarrier in the at least one subcarrier corresponding to the first symbol.

It should be understood that the first transmission resource may further include another subcarrier in the at least one subcarrier corresponding to the first symbol, for example, an $a_1^{th}$ subcarrier, an $a_2^{th}$ subcarrier, a $b_1^{th}$-to-last subcarrier, and a $b_2^{th}$-to-last subcarrier. This is not specifically limited herein.

In an example, the first transmission resource may include the first subcarrier, the second subcarrier, a fourth subcarrier, and a seventh subcarrier in the at least one subcarrier corresponding to the first symbol.

In another example, the first transmission resource may include the second-to-last subcarrier, the third-to-last subcarrier, a fourth-to-last subcarrier, and an eighth-to-last subcarrier in the at least one subcarrier corresponding to the first symbol.

In still another example, the first transmission resource may include the first subcarrier, the second subcarrier, a fourth subcarrier, the last subcarrier, the third-to-last subcarrier, and a fourth-to-last subcarrier in the at least one subcarrier corresponding to the first symbol.

For example, a quantity of subcarriers included in the first transmission resource may be specified in a protocol. It is easy to specify the quantity of subcarriers included in the first transmission resource by using the protocol.

Alternatively, the quantity of subcarriers included in the first transmission resource may meet at least one of the following two conditions:

First, the quantity of subcarriers included in the first transmission resource may be related to a quantity of subcarriers included in the second transmission resource. For example, a larger quantity of subcarriers included in the second transmission resource indicates a larger quantity of subcarriers included in the first transmission resource. For example, a ratio of the quantity of subcarriers included in the first transmission resource to the quantity of subcarriers included in the second transmission resource may meet a preset rule. In an example, the ratio of the quantity of subcarriers included in the first transmission resource to the quantity of subcarriers included in the second transmission resource may be 1/3. It is assumed that the second transmission resource includes six subcarriers, and the first transmission resource may include two subcarriers. According to the foregoing manner, it can be ensured that each service has sufficient (for example, enough to achieve a high enough signal-to-noise ratio for each time of phase tracking, to achieve high enough phase tracking accuracy) resources in frequency domain to send a reference signal. Under a same channel condition, a larger quantity of subcarriers on which a reference signal is sent in a symbol scheduled for each service indicates a higher accuracy of estimating a channel phase change each time, and the larger quantity of subcarriers on which the reference signal is sent in the symbol scheduled for each service indicates better robustness of each estimated channel phase change to the channel condition. Therefore, in the foregoing manner, accuracy and robustness of channel estimation for the service can be improved.

Second, the quantity of subcarriers included in the first transmission resource is related to a modulation and coding scheme (modulation and coding scheme, MCS). According to the foregoing manner, reference signal transmission can adapt to different quality of service (quality of service, QoS) requirements, different channel conditions, and different MCSs.

Figure 4:
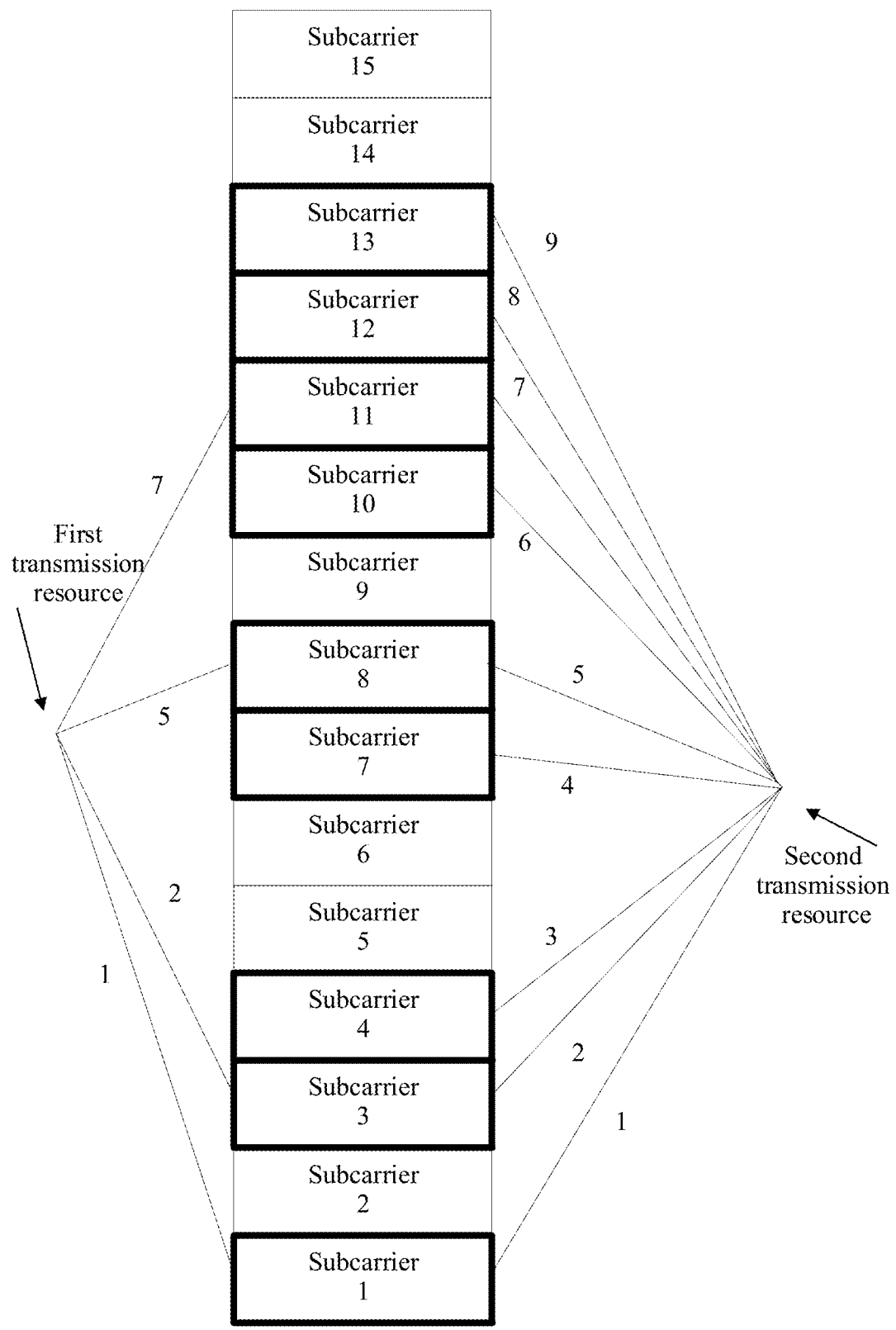
FIG. 4 is a schematic diagram of a first transmission resource according to an embodiment of this application.

Optionally, if the quantity of subcarriers included in the first transmission resource is greater than or equal to 3, the subcarriers included in the first transmission resource may not be arranged at an equal spacing. For example, as shown in FIG. 4, the second transmission resource includes subcarriers 1, 3 and 4, 7 and 8, and 10 to 13 of subcarriers 1 to 15. The first transmission resource includes a first subcarrier, a second subcarrier, a fifth subcarrier, and a seventh subcarrier in subcarriers 1, 2 to 4, 7, and 8 to 12. The first subcarrier included in the first transmission resource is separated from the second subcarrier by one subcarrier, the second subcarrier is separated from the third subcarrier by four subcarriers, and the third subcarrier is separated from the fourth subcarrier by two subcarriers. According to the foregoing design, unnecessary limitation on the frequency domain resource for sending the reference signal can be reduced, and resource overheads for sending the reference signal can be reduced.

In an example, the first symbol may be a $P^{th}$ symbol that belongs to the second transmission resource and that is in every L time-domain resource units, and L and P are integers greater than 0. For example, L may be equal to 1, and P may also be equal to 1. In this case, the first symbol may be a first symbol that belongs to the second transmission resource and that is in each time-domain resource unit. For another example, L may be equal to 2, and P may be equal to 1. In this case, the first symbol may be a first symbol that belongs to the second transmission resource and that is in every two time-domain resource units. For another example, L may be equal to 1, and P may be equal to 3. In this case, the first symbol may be a third symbol that belongs to the second transmission resource and that is in each time-domain resource unit.

For example, L and P may be configured by the primary node. For example, it is assumed that the second node is the primary node, and L and P may be configured by the second node by using a third message. To be specific, the second node sends the third message to the first node, and the third message includes information about values of L and P. For another example, it is assumed that the first node is the primary node, and L and P may be configured by the first node by using a fourth message. To be specific, the first node sends the fourth message to the second node, and the fourth message includes information about values of L and P. According to the foregoing design, a density and/or a location of a time domain resource of a reference signal may be flexibly configured, to flexibly adapt to different channel phase change characteristics or different channel phase change speeds, and reduce reference signal resource overheads while a requirement is met.

Optionally, if the $P^{th}$ symbol that belongs to the second transmission resource does not exist in the L time-domain resource units, no reference signal may be mapped to the L time-domain resource units.

Alternatively, the first symbol may be a $Q^{th}$ symbol that belongs to the second transmission resource and that is in every H first time-domain resource units, and the first time-domain resource unit is a time-domain resource unit that includes some or all resources in the second transmission resource. In other words, the first symbol is the $Q^{th}$ symbol that belongs to the second transmission resource and that is in every H time-domain resource units that include some or all of the resources in the second transmission resource. H and Q are integers greater than 0. For example, H may be equal to 1, and Q may be equal to 1. In this case, the first symbol may be a first symbol that belongs to the second transmission resource and that is in each time-domain resource unit that includes some or all resources in the second transmission resource. For another example, H may be equal to 2, and Q may be equal to 1. In this case, the first symbol may be a first symbol that belongs to the second transmission resource and that is in every two time domain resource units that include some or all resources in the second transmission resource. For another example, H may be equal to 1, and Q may be equal to 3. In this case, the first symbol may be a third symbol that belongs to the second transmission resource and that is in each time-domain resource unit that includes some or all resources in the second transmission resource.

For example, H and Q may be configured by the primary node. For specific configuration manners of H and Q, refer to configuration manners of L and P. Details are not described herein again.

Alternatively, the first symbol may be a $R^{th}$ symbol that belongs to the second transmission resource and that is in a $K^{th}$ time-domain resource unit in every G first time-domain resource units, and the first time-domain resource unit is a time-domain resource unit that includes some or all resources in the second transmission resource. In other words, the first symbol is the $R^{th}$ symbol that belongs to the second transmission resource and that is in the $K^{th}$ time-domain resource unit in every G time-domain resource units that include some or all of the resources in the second transmission resource. G, K, and R are integers greater than 0.

For example, G may be equal to 1, K may be equal to 1, and R may be equal to 1. In this case, the first symbol may be a first symbol that belongs to the second transmission resource and that is in each time-domain resource unit that includes some or all of the resources in the second transmission resource. For another example, G may be equal to 2, K may be equal to 1, and R may be equal to 1. In this case, the first symbol may be a first symbol that belongs to the second transmission resource and that is in a first time-domain resource unit in every two time-domain resource units that include some or all resources in the second transmission resource. For another example, G may be equal to 2, K may be equal to 1, and R may be equal to 3. In this case, the first symbol may be a third symbol that belongs to the second transmission resource and that is in a first time-domain resource unit in every two time-domain resource units that include some or all resources in the second transmission resource.

For example, G, K, and R may be configured by the primary node. For specific configuration manners of G, K and R, refer to configuration manners of L and P. Details are not described herein again.

Alternatively, the first symbol may be a $J^{th}$ symbol that belongs to the second transmission resource and that is in a $T^{th}$ first time-domain resource unit in every W time-domain resource units, and the first time-domain resource unit is a time-domain resource unit that includes some or all resources in the second transmission resource. In other words, the first symbol is the $R^{th}$ symbol that belongs to the second transmission resource and that is in the $T^{th}$ time domain resource that includes some or all resources in the second transmission resource in every W time domain resource units. W, T, and J are integers greater than 0.

For example, W may be equal to 1, T may be equal to 1, and J may be equal to 1. In this case, the first symbol may be a first symbol that belongs to the second transmission resource and that is in each time-domain resource unit. For another example, W may be equal to 2, T may be equal to 1, and J may be equal to 1. In this case, the first symbol may be a first symbol that belongs to the second transmission resource and that is in a first time-domain resource unit that includes some or all resources in the second transmission resource in every two time-domain resource units. For another example, W may be equal to 3, T may be equal to 1, and J may be equal to 2. In this case, the first symbol may be a second symbol that belongs to the second transmission resource and that is in a first time domain resource unit that includes some or all resources in the second transmission resource in every three time-domain resource units For example, W, T, and J may be configured by the primary node. For specific configuration manners of W, T, and J, refer to configuration manners of L and P. Details are not described herein again.

Optionally, if the $T^{th}$ time-domain resource unit that includes some or all resources in the second transmission resource does not exist in the W time-domain resource units, or the $R^{th}$ symbol that belongs to the second transmission resource does not exist in the $T^{th}$ time-domain resource unit that includes some or all resources in the second transmission resource in every W time-domain resource units, no reference signal may be mapped to the W time-domain resource units.

In an example description, the time-domain resource unit may be a radio frame, a hyper frame, a slot, a subframe, or the like. This is not specifically limited in this embodiment.

In the foregoing design, a rule for configuring the time-domain resource of the reference signal is provided, so that each service has a sufficiently dense reference signal resource in time domain (for example, dense enough to meet a delay requirement of a noise reduction service).

Optionally, the reference signal and a synchronization signal may have a same complex number mapped to a same subcarrier. Therefore, when the reference signal is mapped to the subcarrier, the complex number mapped to the subcarrier may be determined based on the complex number that is of the synchronization signal and that is mapped to the subcarrier, or the complex number mapped to the subcarrier may be determined by using a same rule as the synchronization signal.

Alternatively, a complex number that is of the reference signal and that is mapped to a first resource unit in the first transmission resource based on quadrature phase shift keying (quadrature phase shift keying, QPSK) modulation may be related to a frequency domain location and/or a time domain location of the first resource unit. According to the foregoing manner, complex numbers mapped to different subcarriers and/or different symbols may be different, and an effect of interference randomization is achieved.

The complex number mapped based on QPSK modulation may have four different selectable values. The complex number that is of the reference signal and that is mapped to the first resource unit in the first transmission resource based on QPSK modulation is related to the frequency domain location and/or the time domain location of the first resource unit. It may be understood that one of the four different selectable values is determined as the complex number mapped to the first resource unit based on the frequency domain location and/or the time domain location of the first resource unit.

Optionally, the first node may further send a DMRS to the second node, so that the second node may determine an amplitude and a phase of a channel based on the DMRS.

A manner of performing channel estimation based on a DMRS is used a comparison. When channel estimation is performed based on a DMRS, not every symbol in time domain has a DMRS, and for a symbol without a DMRS, a channel estimated by using a symbol with a DMRS before the symbol and a channel estimated by using a symbol with a DMRS following the symbol may be interpolated in time domain, to estimate a channel on the symbol without a DMRS. However, in this manner, interpolation can be implemented only after the symbol with a DMRS following the symbol without a DMRS is received, so that a delay is high, and a low delay requirement of the noise reduction service cannot be met. However, in this embodiment of this application, phase tracking may be performed on the channel by using the reference signal. In a manner of combining the DMRS with the reference signal, there is no need to wait for a subsequent symbol with a DMRS, so that a delay is low, and the low delay requirement of the noise reduction service can be met.

When channel estimation is performed by using a DMRS, for a symbol without a DMRS, extrapolation may be performed on a channel estimated by using a symbol with a DMRS before the symbol without a DMRS, so that a channel on the symbol without a DMRS can be estimated. Alternatively, the channel estimated by using the symbol with a DMRS before the symbol without a DMRS may be used as a channel estimation result on the symbol without a DMRS. However, precision of channel estimation in this manner is low, and a requirement of high reliability of single transmission of the noise reduction service cannot be met. However, in this embodiment of this application, phase tracking may be performed on the channel by using the reference signal, and precision of channel estimation may be improved by combining the DMRS with the reference signal, to meet the requirement of high reliability of single transmission of the noise reduction service.

S302: The first node sends the reference signal. Correspondingly, the second node receives the reference signal on the first transmission resource.

A manner of determining the first transmission resource by the second node is the same as a manner of determining the first transmission resource by the first node. For details, refer to related descriptions of step S302. Details are not described herein again.

S303: The second node determines the phase information of the channel based on the reference signal.

Optionally, the second node may further receive a DMRS. The second node may determine an amplitude and a phase of a channel based on the DMRS, and perform phase tracking on the channel based on the PTRS, to determine a phase change characteristic of the channel. The second node may obtain a characteristic of the channel based on the amplitude and the phase of the channel and the phase change characteristic of the channel, to perform data transmission based on the characteristic of the channel.

In this embodiment of this application, a time domain location and a frequency domain location of a reference signal resource in a time-frequency resource scheduled by a service are specified by using a rule, so that a reference signal resource is configured for each service for channel phase tracking, to improve accuracy of channel estimation of the service, and further improve reliability of data transmission and reduce a delay of data transmission. In addition, in this embodiment of this application, a reference signal resource is configured in a time-frequency resource scheduled for each service, to ensure that no conflict exists between reference signal resources corresponding to different services when different services are scheduled.

Values of M, N, L, and P, or H and Q, or G, K, and R, or W, T, and J may be 1. This simple rule can ensure that each noise reduction service usually has a reference signal resource.

Further, M, N, L, and P, or H and Q, or G, K, and R, or W, T, and J may be indicated by scheduling signaling, so that a frequency domain location and a time domain location of a reference signal resource of each noise reduction service may be flexibly configured, to adapt to different channel conditions, especially to different channel frequency selection characteristics.

In addition, a quantity of symbols and a quantity of subcarriers for transmitting a reference signal are configurable, so that the quantity of symbols and the quantity of subcarriers for transmitting a reference signal may be configured based on a service requirement. For example, more transmission resources of the service indicate that the reference signal may be configured on more symbols and subcarriers, to ensure that in a vehicle-mounted short-range wireless communication system, each service has sufficient (for example, enough to achieve a high enough signal-to-noise ratio for each time of phase tracking, to achieve high enough phase tracking accuracy) reference signal resources in frequency domain and sufficiently dense (for example, dense enough to meet a delay requirement of the service) reference signal resources in time domain.

In addition, when the quantity of subcarriers included in the first transmission resource is greater than or equal to 3, the subcarriers included in the first transmission resource may not be arranged at an equal spacing. According to the foregoing design, unnecessary limitation on the frequency domain resource for sending the reference signal can be reduced, and resource overheads for sending the reference signal can be reduced.

Figure 5:
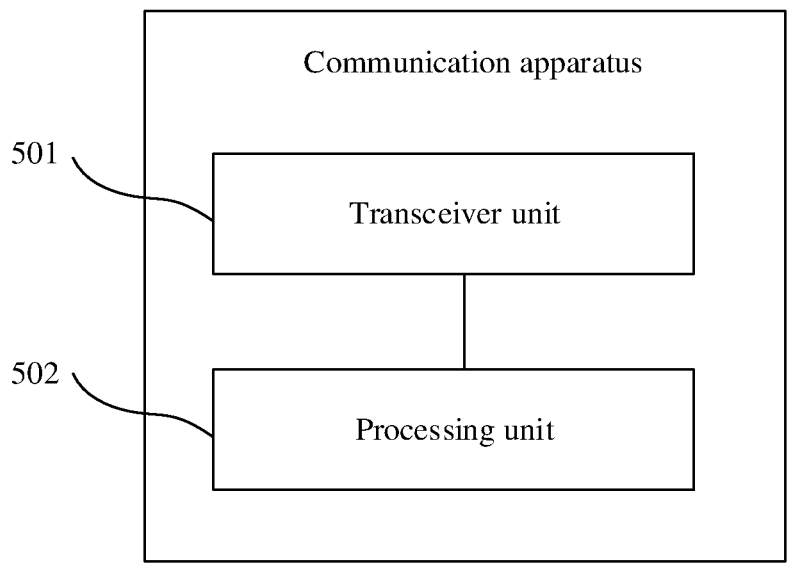
FIG. 5 is a schematic diagram of a structure of a communication apparatus according to an embodiment of this application.

Based on a same inventive concept as the method embodiments, an embodiment of this application provides a communication apparatus. A structure of the communication apparatus may be shown in FIG. 5. The communication apparatus includes a transceiver unit 501 and a processing unit 502.

In an implementation, the communication apparatus may specifically be configured to implement the method performed by the first node in the embodiment in FIG. 3. The apparatus may be the first node, or may be a chip, a chipset, or a part of a chip that performs related method functions in the first node. The processing unit 502 is configured to map a reference signal to a first transmission resource. The first transmission resource is included in a second transmission resource, the second transmission resource is used by a first node to send data, and the second transmission resource includes a first symbol and at least one subcarrier corresponding to the first symbol. The first transmission resource includes at least one of an $M^{th}$ subcarrier or an $N^{th}$-to-last subcarrier in the at least one subcarrier corresponding to the first symbol, where M and N are integers greater than 0, and M and N are preset, specified in a protocol, or configured. The reference signal is used to determine phase information of a channel. The transceiver unit 501 is configured to send the reference signal.

Optionally, the first transmission resource may further include at least one of an $A^{th}$ subcarrier or a $B^{th}$-to-last subcarrier in the at least one subcarrier corresponding to the first symbol, where A and B are integers greater than 0, and A and B are preset, specified in the protocol, or configured.

For example, M and N are configured by a second node by using a first message, or M and N are configured by the first node by using a second message.

Optionally, a value of M includes at least one of the following values: 1 and 2; and/or a value of N includes at least one of the following values: 1 and 2.

In an example, a quantity of subcarriers included in the first transmission resource is related to a quantity of subcarriers included in the second transmission resource; and/or a quantity of subcarriers included in the first transmission resource is related to an MCS.

The subcarriers included in the first transmission resource may not be arranged at an equal spacing.

Optionally, the first symbol is a $P^{th}$ symbol that belongs to the second transmission resource and that is in every L time-domain resource units, and L and P are integers greater than 0.

Alternatively, the first symbol is a $Q^{th}$ symbol that belongs to the second transmission resource and that is in every H first time-domain resource units, the first time-domain resource unit is a time-domain resource unit that includes some or all resources of the second transmission resource, and H and Q are integers greater than 0.

Alternatively, the first symbol is a $J^{th}$ symbol that belongs to the second transmission resource and that is in a $T^{th}$ first time-domain resource unit in every W time-domain resource units, the first time-domain resource unit is a time-domain resource unit that includes some or all resources of the second transmission resource, and W, T, and J are integers greater than 0.

Alternatively, the first symbol is a $R^{th}$ symbol that belongs to the second transmission resource and that is in a $K^{th}$ time-domain resource unit in every G first time-domain resource units, the first time-domain resource unit is a time-domain resource unit that includes some or all resources in the second transmission resource, and G, K, and R are integers greater than 0.

Optionally, L and P are configured by the second node by using a third message, or H and Q are configured by the second node by using a third message, or G, K, and R are configured by the second node by using a third message, or W, T, and J are configured by the second node by using a third message.

Alternatively, L and P are configured by the first node by using a fourth message, or H and Q are configured by the first node by using a fourth message, or G, K, and R are configured by the first node by using a fourth message, or W, T, and J are configured by the first node by using a fourth message.

For example, a value of L is 1, and/or a value of P is 1; or
    a value of H is 1, and/or a value of Q is 1; or
    a value of G is 1, and/or a value of K is 1, and/or a value of R is 1; or
    a value of W is 1, and/or a value of T is 1, and/or a value of J is 1.

Optionally, the reference signal and a synchronization signal have a same complex number mapped to a same subcarrier.

Alternatively, a complex number that is of the reference signal and that is mapped to a first resource unit in the first transmission resource based on QPSK modulation is related to a frequency domain location and/or a time domain location of the first resource unit.

For example, the second transmission resource is scheduled by using a subcarrier as a granularity in frequency domain.

In an implementation, the communication apparatus may specifically be configured to implement the method performed by the second node in the embodiment in FIG. 3. The apparatus may be the second node, or may be a chip, a chipset, or a part of a chip that performs related method functions in the second node. The transceiver unit 501 is configured to receive a reference signal on a first transmission resource. The first transmission resource is included in a second transmission resource, the second transmission resource is used by a first node to send data, and the second transmission resource includes a first symbol and at least one subcarrier corresponding to the first symbol. The first transmission resource includes at least one of an $M^{th}$ subcarrier or an $N^{th}$-to-last subcarrier in the at least one subcarrier corresponding to the first symbol, where M and N are integers greater than 0, and M and N are preset, specified in a protocol, or configured. The reference signal is used to determine phase information of a channel. The processing unit 502 is configured to determine phase information of a channel based on the reference signal.

Optionally, the first transmission resource may further include at least one of an $A^{th}$ subcarrier or a $B^{th}$-to-last subcarrier in the at least one subcarrier corresponding to the first symbol, where A and B are integers greater than 0, and A and B are preset, specified in the protocol, or configured.

For example, M and N are configured by a second node by using a first message, or M and N are configured by the first node by using a second message.

Optionally, a value of M includes at least one of the following values: 1 and 2; and/or a value of N includes at least one of the following values: 1 and 2.

In an example, a quantity of subcarriers included in the first transmission resource is related to a quantity of subcarriers included in the second transmission resource; and/or a quantity of subcarriers included in the first transmission resource is related to an MCS.

The subcarriers included in the first transmission resource may not be arranged at an equal spacing.

Optionally, the first symbol is a $P^{th}$ symbol that belongs to the second transmission resource and that is in every L time-domain resource units, and L and P are integers greater than 0.

Alternatively, the first symbol is a $Q^{th}$ symbol that belongs to the second transmission resource and that is in every H first time-domain resource units, the first time-domain resource unit is a time-domain resource unit that includes some or all resources of the second transmission resource, and H and Q are integers greater than 0.

Alternatively, the first symbol is a $J^{th}$ symbol that belongs to the second transmission resource and that is in a $T^{th}$ first time-domain resource unit in every W time-domain resource units, the first time-domain resource unit is a time-domain resource unit that includes some or all resources of the second transmission resource, and W, T, and J are integers greater than 0.

Alternatively, the first symbol is a $R^{th}$ symbol that belongs to the second transmission resource and that is in a $K^{th}$ time-domain resource unit in every G first time-domain resource units, the first time-domain resource unit is a time-domain resource unit that includes some or all resources in the second transmission resource, and G, K, and R are integers greater than 0.

Optionally, L and P are configured by the second node by using a third message, or H and Q are configured by the second node by using a third message, or G, K, and R are configured by the second node by using a third message, or W, T, and J are configured by the second node by using a third message.

Alternatively, L and P are configured by the first node by using a fourth message, or H and Q are configured by the first node by using a fourth message, or G, K, and R are configured by the first node by using a fourth message, or W, T, and J are configured by the first node by using a fourth message.

For example, a value of L is 1, and/or a value of P is 1; or
    a value of H is 1, and/or a value of Q is 1; or
    a value of G is 1, and/or a value of K is 1, and/or a value of R is 1; or
    a value of W is 1, and/or a value of T is 1, and/or a value of J is 1.

Optionally, the reference signal and a synchronization signal have a same complex number mapped to a same subcarrier.

Alternatively, a complex number that is of the reference signal and that is mapped to a first resource unit in the first transmission resource based on QPSK modulation is related to a frequency domain location and/or a time domain location of the first resource unit.

For example, the second transmission resource is scheduled by using a subcarrier as a granularity in frequency domain.

Division into modules in embodiments of this application is an example, and is merely logical function division. During actual implementation, there may be another division manner. In addition, functional modules in embodiments of this application may be integrated into one processor, or each of the modules may exist alone physically, or two or more modules may be integrated into one module. The integrated module may be implemented in a form of hardware, or may be implemented in a form of a software functional module. It may be understood that for functions or implementations of the modules in embodiments of this application, further refer to related descriptions in the method embodiments.

Figure 6:
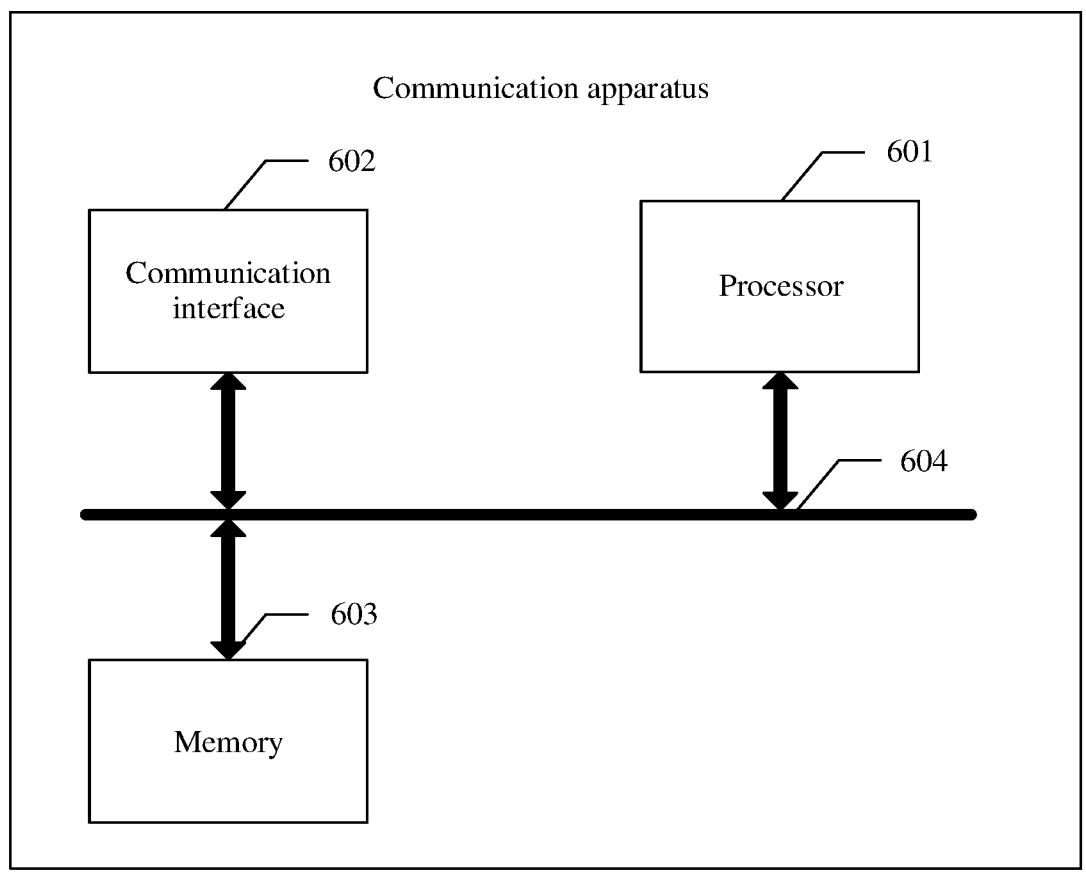
FIG. 6 is a schematic diagram of a structure of another communication apparatus according to an embodiment of this application.

In a possible implementation, a communication apparatus may be shown in FIG. 6. The apparatus may be a communication device or a chip in a communication device, and the communication device may be a first node, or may be a second node. The apparatus may include a processor 601, a communication interface 602, and a memory 603. The processing unit 502 may be the processor 601. The transceiver unit 501 may be the communication interface 602.

The processor 601 may be a central processing unit (central processing unit, CPU), a digital processing unit, or the like. The communication interface 602 may be a transceiver, an interface circuit such as a transceiver circuit, a transceiver chip, or the like. The apparatus further includes the memory 603, configured to store a program executed by the processor 601. The memory 603 may be a nonvolatile memory, for example, a hard disk drive (hard disk drive, HDD) or a solid-state drive (solid-state drive, SSD), or may be a volatile memory (volatile memory), for example, a random access memory (random access memory, RAM). The memory 603 is any other medium that can carry or store expected program code in a form of instructions or a data structure and can be accessed by a computer, but is not limited thereto.

The processor 601 is configured to execute the program code stored in the memory 603, and is specifically configured to perform an action of the processing unit 502. Details are not described in this application.

The communication interface 602 is configured to perform an action of the transceiver unit 501. Details are not described in this application.

A specific connection medium between the communication interface 602, the processor 601, and the memory 603 is not limited in this embodiment of this application. In this embodiment of this application, in FIG. 6, the memory 603, the processor 601, and the communication interface 602 are connected by using a bus 604. The bus is represented by using a bold line in FIG. 6. A connection manner between other parts is merely an example for description, and does not constitute a limitation. The bus may be classified into an address bus, a data bus, a control bus, and the like. For ease of representation, only one bold line is used to represent the bus in FIG. 6, but this does not mean that there is only one bus or only one type of bus.

An embodiment of the present invention further provides a computer-readable storage medium, configured to store computer software instructions that need to be executed for execution of the foregoing processor, and the computer-readable storage medium includes a program that needs to be executed for execution of the foregoing processor.

A person skilled in the art should understand that embodiments of this application may be provided as a method, a system, or a computer program product. Therefore, this application may use a form of a hardware-only embodiment, a software-only embodiment, or an embodiment with a combination of software and hardware. In addition, this application may use a form of a computer program product implemented on one or more computer-usable storage media (including but not limited to a disk memory, a CD-ROM, an optical memory, and the like) that include computer-usable program code.

This application is described with reference to the flowcharts and/or block diagrams of the method, the device (system), and the computer program product according to this application. It should be understood that computer program instructions may be used to implement each process and/or each block in the flowcharts and/or the block diagrams and a combination of a process and/or a block in the flowcharts and/or the block diagrams. The computer program instructions may be provided for a general-purpose computer, a dedicated computer, an embedded processor, or a processor of another programmable data processing device to generate a machine, so that the instructions executed by the computer or the processor of the another programmable data processing device generate an apparatus for implementing a specific function in one or more procedures in the flowcharts and/or in one or more blocks in the block diagrams.

The computer program instructions may alternatively be stored in a computer-readable memory that can indicate a computer or another programmable data processing device to work in a specific manner, so that the instructions stored in the computer-readable memory generate an artifact that includes an instruction apparatus. The instruction apparatus implements a specific function in one or more procedures in the flowcharts and/or in one or more blocks in the block diagrams.

The computer program instructions may alternatively be loaded onto a computer or another programmable data processing device, so that a series of operations and steps are performed on the computer or the another programmable device, to generate computer-implemented processing. Therefore, the instructions executed on the computer or the another programmable device provide steps for implementing a specific function in one or more procedures in the flowcharts and/or in one or more blocks in the block diagrams.

It is clear that, a person skilled in the art can make various modifications and variations to this application without departing from the protection scope of this application. This application is intended to cover these modifications and variations of this application provided that they fall within the scope of protection defined by the claims of this application and their equivalent technologies.

What is claimed is:

1. A reference signal transmission method, comprising:
    mapping, by a first node, a reference signal to a first transmission resource, wherein the first transmission resource is comprised in a second transmission resource, the second transmission resource is used by the first node to send data, and the second transmission resource comprises a first symbol and at least one subcarrier corresponding to the first symbol, and wherein:
    the first transmission resource comprises at least one of an $M^{th}$ subcarrier or an $N^{th}$-to-last subcarrier in the at least one subcarrier corresponding to the first symbol, M and N are integers greater than 0, and M and N are preset, specified in a protocol, or configured; and
    the reference signal is used to determine phase information of a channel; and
    sending, by the first node, the reference signal.

2. The reference signal transmission method according to claim 1, wherein at least one of the following is satisfied:
    a value of M comprises at least one of 1 or 2; or
    a value of N comprises at least one of 1 or 2.

3. The reference signal transmission method according to claim 1, wherein:
    the first symbol is a $P^{th}$ symbol that belongs to the second transmission resource and that is in each one of L time-domain resource units, and L and P are integers greater than 0; or
    the first symbol is a $Q^{th}$ symbol that belongs to the second transmission resource and that is in each one of H first time-domain resource units, the first time-domain resource unit is a time-domain resource unit that comprises some or all resources of the second transmission resource, and H and Q are integers greater than 0; or
    the first symbol is a $J^{th}$ symbol that belongs to the second transmission resource and that is in a $T^{th}$ first time-domain resource unit in each one of W time-domain resource units, the first time-domain resource unit is a time-domain resource unit that comprises some or all resources of the second transmission resource, and W, T, and J are integers greater than 0; or
    the first symbol is a $R^{th}$ symbol that belongs to the second transmission resource and that is in a $K^{th}$ time-domain resource unit in each one of G first time-domain resource units, the first time-domain resource unit is a time-domain resource unit that comprises some or all resources in the second transmission resource, and G, K, and R are integers greater than 0.

4. The reference signal transmission method according to claim 3, wherein:
    at least one of a value of L or a value of P is 1; or
    at least one of a value of H or a value of Q is 1; or
    at least one of a value of G, a value of K, or a value of R is 1; or
    at least one of a value of W, a value of T, or a value of J is 1.

5. The reference signal transmission method according to claim 1, wherein:
the reference signal and a synchronization signal have a same complex number mapped to a same subcarrier; or
a complex number that is of the reference signal and that is mapped to a first resource unit in the first transmission resource based on quadrature phase shift keying (QPSK) modulation is related to at least one of a frequency domain location or a time domain location of the first resource unit.

6. The reference signal transmission method according to claim 1, wherein the second transmission resource is scheduled by using a subcarrier as a granularity in frequency domain.

7. A reference signal transmission method, comprising:
receiving, by a second node, a reference signal on a first transmission resource, wherein the first transmission resource is comprised in a second transmission resource, the second transmission resource is used by a first node to send data, and the second transmission resource comprises a first symbol and at least one subcarrier corresponding to the first symbol, and wherein:
the first transmission resource comprises at least one of an $M^{th}$ subcarrier or an $N^{th}$-to-last subcarrier in the at least one subcarrier corresponding to the first symbol, M and N are integers greater than 0, and M and N are preset, specified in a protocol, or configured; and
the reference signal is used to determine phase information of a channel; and
determining, by the second node, phase information of a channel based on the reference signal.

8. The reference signal transmission method according to claim 7, wherein at least one of the following is satisfied:
a value of M comprises at least one of 1 or 2; or
a value of N comprises at least one 1 or 2.

9. The reference signal transmission method according to claim 7, wherein:
the first symbol is a $P^{th}$ symbol that belongs to the second transmission resource and that is in each one of L time-domain resource units, and L and P are integers greater than 0; or
the first symbol is a $Q^{th}$ symbol that belongs to the second transmission resource and that is in each one of H first time-domain resource units, the first time-domain resource unit is a time-domain resource unit that comprises some or all resources of the second transmission resource, and H and Q are integers greater than 0; or
the first symbol is a $J^{th}$ symbol that belongs to the second transmission resource and that is in a $T^{th}$ first time-domain resource unit in each one of W time-domain resource units, the first time-domain resource unit is a time-domain resource unit that comprises some or all resources of the second transmission resource, and W, T, and J are integers greater than 0; or
the first symbol is a $R^{th}$ symbol that belongs to the second transmission resource and that is in a $K^{th}$ time-domain resource unit in each one of G first time-domain resource units, the first time-domain resource unit is a time-domain resource unit that comprises some or all resources in the second transmission resource, and G, K, and R are integers greater than 0.

10. The reference signal transmission method according to claim 9, wherein:
at least one of a value of L or a value of P is 1; or
at least one of a value of H or a value of Q is 1; or
at least one of a value of G, a value of K, or a value of R is 1; or
at least one of a value of W, a value of T, or a value of J is 1.

11. The reference signal transmission method according to claim 7, wherein;
the reference signal and a synchronization signal have a same complex number mapped to a same subcarrier; or
a complex number that is of the reference signal and that is mapped to a first resource unit in the first transmission resource based on quadrature phase shift keying (QPSK) modulation is related to at least one of a frequency domain location or a time domain location of the first resource unit.

12. The reference signal transmission method according to claim 7, wherein the second transmission resource is scheduled by using a subcarrier as a granularity in frequency domain.

13. An apparatus, comprising:
at least one processor; and
one or more memories coupled to the at least one processor and storing programming instructions for execution by the at least one processor to:
map a reference signal to a first transmission resource, wherein the first transmission resource is comprised in a second transmission resource, the second transmission resource is used by the apparatus to send data, and the second transmission resource comprises a first symbol and at least one subcarrier corresponding to the first symbol, and wherein:
the first transmission resource comprises at least one of an $M^{th}$ subcarrier or an $N^{th}$-to-last subcarrier in the at least one subcarrier corresponding to the first symbol, M and N are integers greater than 0, and M and N are preset, specified in a protocol, or configured; and
the reference signal is used to determine phase information of a channel; and
send the reference signal.

14. The apparatus according to claim 13, wherein at least one of the following is satisfied:
a value of M comprises at least one of 1 or 2; or
a value of N comprises at least one of 1 or 2.

15. The apparatus according to claim 13, wherein a quantity of subcarriers comprised in the first transmission resource is related to at least one of:
a quantity of subcarriers comprised in the second transmission resource; or
a modulation and coding scheme (MCS).

16. The apparatus according to claim 13, wherein subcarriers comprised in the first transmission resource are not arranged at an equal spacing.

17. The apparatus according to claim 13, wherein:
the first symbol is a $P^{th}$ symbol that belongs to the second transmission resource and that is in each one of L time-domain resource units, and L and P are integers greater than 0; or
the first symbol is a $Q^{th}$ symbol that belongs to the second transmission resource and that is in each one of H first time-domain resource units, the first time-domain resource unit is a time-domain resource unit that comprises some or all resources of the second transmission resource, and H and Q are integers greater than 0; or
the first symbol is a $J^{th}$ symbol that belongs to the second transmission resource and that is in a $T^{th}$ first time-domain resource unit in each one of W time-domain resource units, the first time-domain resource unit is a time-domain resource unit that comprises some or all resources of the second transmission resource, and W, T, and J are integers greater than 0; or the first symbol is a $R^{th}$ symbol that belongs to the second transmission resource and that is in a $K^{th}$ time-domain resource unit in each one of G first time-domain resource units, the first time-domain resource unit is a time-domain resource unit that comprises some or all resources in the second transmission resource, and G, K, and R are integers greater than 0.

18. The apparatus according to claim 17, wherein;
at least one of a value of L or a value of P is 1; or
at least one of a value of H or a value of Q is 1; or
at least one of a value of G, a value of K, or a value of R is 1; or
at least one of a value of W, a value of T, or a value of J is 1.

19. The apparatus according to claim 13, wherein:
the reference signal and a synchronization signal have a same complex number mapped to a same subcarrier; or
a complex number that is of the reference signal and that is mapped to a first resource unit in the first transmission resource based on quadrature phase shift keying (QPSK) modulation is related to at least one of a frequency domain location or a time domain location of the first resource unit.

20. The apparatus according to claim 13, wherein the second transmission resource is scheduled by using a subcarrier as a granularity in frequency domain.

\* \* \* \* \*